Sept. 17, 1935.    J. PUTZ    2,014,582
SAFETY RECEPTACLE
Filed June 29, 1934
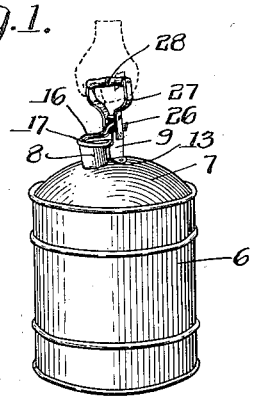
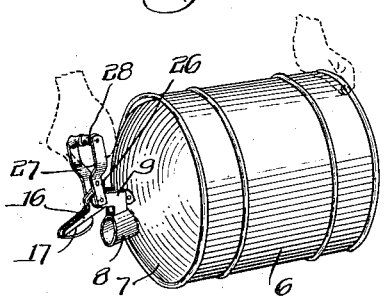
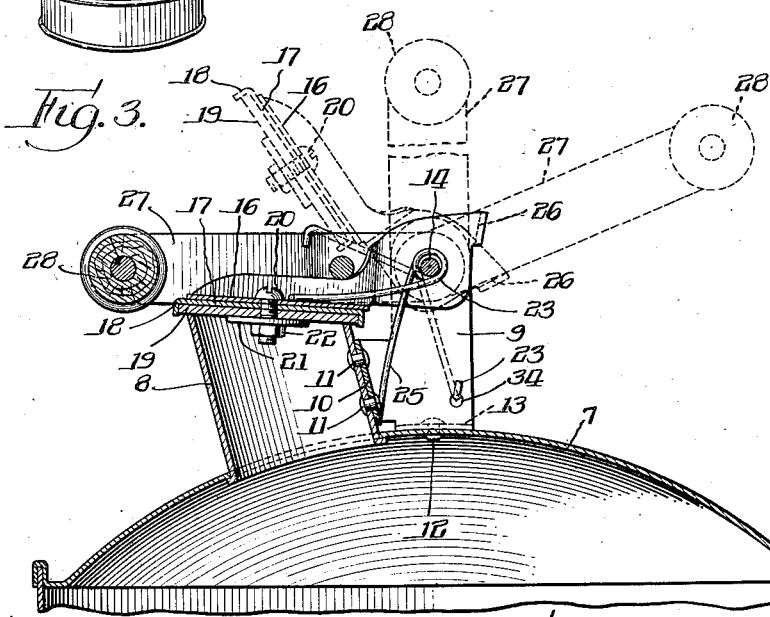
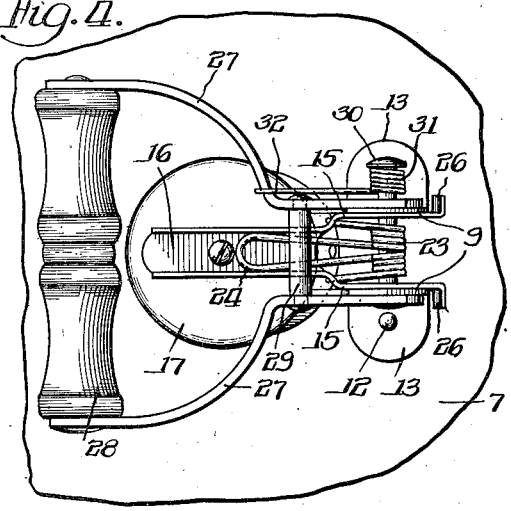
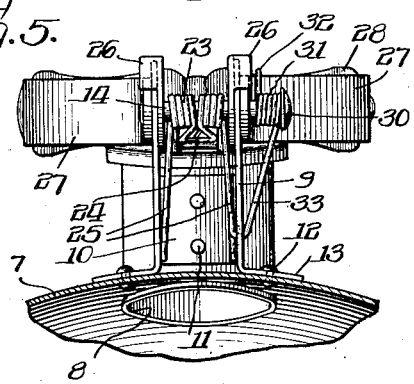
Inventor:
Joseph Putz Patented Sept. 17, 1935

2,014,582

UNITED STATES PATENT OFFICE 2,014,582

SAFETY RECEPTACLE

Joseph Putz, Chicago, Ill., assignor to Miller-Peerless Manufacturing Company, Chicago, Ill., a corporation of Illinois Application June 29, 1934, Serial No. 733,030

11 Claims. (Cl. 220—35)

This invention relates in general to a receptacle having a pouring spout which is spring sealed and automatically opened only when the receptacle is raised for pouring and has more particular reference to a receptacle for containing inflammable and explosive liquids.

An important object of the invention is therefore to provide a receptacle with a spring closed spout which has a handle so related thereto that the receptacle may be raised and carried by the handle without opening the spout, but when the receptacle is raised or inclined for pouring, the handle will automatically open the spout against its closure spring.

A further object of the invention is in the provision of a safety receptacle of this kind which checks evaporation, reduces danger of fire and explosion, permits quick, easy filling and emptying, pours with a steady stream and is safe, practical and economical in storing and handling inflammable liquids.

A still further object of the invention is in the provision of a handle which constitutes a carrier, a protector for the spout, and also means for automatically opening the spout when the receptacle is raised by the handle for pouring.

Other objects of the invention will appear hereinafter, the preferred construction being illustrated by the accompanying drawing in which Fig. 1 represents a container in accordance with this invention having the handle raised for carrying it and with the spout closed;

Fig. 2 shows the receptacle inclined for pouring and supported at the pouring end by the handle which automatically raises the cover from the spout in the pouring position;

Fig. 3 is a sectional view of the mechanism;

Fig. 4 is a top view of the handle and spout mechanism in closed position; and

Fig. 5 is a rear view of the mechanism as shown in Fig. 4.

In handling and storing inflammable and explosive liquids it is now compulsory in many localities to provide a sealed receptacle which will check evaporation of the liquid and reduce the danger from fire and explosion. The present invention fulfills all these requirements by providing a spring actuated spout closure in conjunction with a handle arranged relatively thereto so that the cover for the spout remains closed when the handle is in a closed position or raised for lifting the receptacle, but as soon as the handle is rotated to support the adjacent end of a receptacle for pouring, the contact of the handle with a portion of the cover will raise it to uncover the spout.

Referring now more particularly to the drawing, a receptacle 6 preferably of metal has a top 7 secured thereto and extending from the top is a pouring spout 8 preferably made of brass to prevent corrosion and discoloration by any liquid which the receptacle may contain and of a diameter sufficiently large to receive the standard filling station nozzle.

A supporting bracket has two spaced uprights 9 connected by a portion 10 which is secured by rivets 11 or the like to the spout 8 and at the bottom it is secured to the top 7 by rivets 12 inserted through projection 13. This provides a strong and rigid support for the bracket arms and strengthens the attachment of the spout to the end of the top.

A bearing pin 14 is mounted to extend transversely in the upper ends of the arms 9 and pivoted thereon between the arms are the forked extremities 15 of a cover support 16 which is preferably channel-shaped in cross section to support a metal lid or cover 17 having a downwardly extending flange 18 for seating a gasket or washer 19 in the under side thereof to contact with the upper flat end of the pouring spout 8. The cover and gasket are secured to the support 16 in any suitable manner as by means of a fastening screw or bolt 20 inserted therethrough and having a washer 21 and a fastening nut 22 at the under side of the gasket.

In order to hold the cover firmly over the pouring spout, a spring 23 has an intermediate loop 24 bearing and received within the channel shaped portion of the support 16, and is then wound about the bearing pin 14 so that the extremities 25 are received and retained by the angular corners of the bracket at the sides of the arms 9.

Extending outwardly from the ends of the support 16 adjacent but beyond the upper ends of the arms 9 are ears 26 which are free from contact with the ends of the arms 9 and are adapted to be engaged by side supports 27 of a handle 28. These side supports 27 are also mounted upon the bearing pin 14 at the outsides of the arms 9 and are connected at a distance from their pivotal bearing by a cross piece 29 which holds the supports together. One end of the bearing pin 14 is preferably formed with a head 30 so that a spring 31 may be wound thereon, having one extremity 32 in engagement with the upper side of one of the handle supports 27 and the other extremity 33 extends downwardly and through a perforation 34 in the adjacent bracket arm 9 where the end thereof is turned upwardly for pinning this end of the spring tightly in place.

The tendency of this spring 31 is to hold the handle downwardly over the top of the spout, the cross piece 29 of the handle engaging the upper edges of the channel support 16 for the cover for holding the handle in place. When the handle is raised against its spring 31 to an upright position as shown in Fig. 1, the handle supports 27 are free from contact with the outwardly projecting ears 26 of the cover support and it is only when the handle is rotated rearwardly a further distance that the supports 27 thereof engage the ears 26 and cause the cover 18 to be raised from the end of the pouring spout as shown when the receptacle is in position for pouring as represented in Fig. 2. As soon as the handle is released or the receptacle is returned to upright position the spring for the cover returns it to closing position, and the spring for the handle returns it to an upright position or to a protecting closed position over the top of the cover.

For filling the receptacle the cover 17 may be raised for uncovering the end of the spout by turning the handle a sufficient distance to engage the ears 26 for raising the cover. A filling nozzle may then be inserted for replenishing the contents of the receptacle.

With this structure the spout cover is independent of the handle, the handle and spout cover are separately spring pressed, the handle in its lowermost position extends over and protects the spout cover and although the handle may be raised to an upright position for carrying the receptacle the spout is not uncovered until the handle is rotated a sufficient distance to engage the ears 26 of the cover support and move it against its spring as in supporting the end of the receptacle for pouring. By keeping the spout tightly closed the contents are prevented from leakage, evaporation is checked, and the danger of fire and explosion is greatly reduced. Should the receptacle and its contents be exposed to high temperatures, the spout cover being spring-pressed will yield under predetermined inside pressure, permitting excess gases to escape and thereby further tending to prevent explosion. Although this safety construction is applicable wherever it may be used, it is particularly intended for portable containers which are intended to be raised, tilted and supported by the handle in pouring.

I claim:

1. A safety container having a pouring spout, a spring pressed cover to close the spout, and a separate spring-pressed handle to extend over and guard the cover when closed, to swing through a wide arc free from the cover and to lift the receptacle vertically without raising the cover, and to open the cover against its spring when the receptacle is supported by the handle for pouring.

2. A container having a top pouring spout, a cover therefor and a handle independently hinged mounted to carry the container without engaging the cover and to engage the cover for opening it when the container is tilted for pouring.

3. A safety container having a top and a pouring spout therein, a supporting bracket secured to the spout and the top for strengthening the spout, a cover pivoted in the bracket and movable over the end of the spout, and a handle separately mounted in the bracket and entirely free from the cover for a part of its movement but having a portion adapted to engage the cover for raising it when the container is tilted beyond the carrying position for pouring.

4. A safety container having a pouring spout, a bracket adjacent the spout, a cover for the spout pivoted in the bracket, a handle also pivoted in the bracket, the cover and the handle being free of each other for carrying the container and having portions for interengaging when the handle is rotated a predetermined amount beyond the carrying position to raise the cover from the end of the spout.

5. In a safety container, a spout, a cover therefor, a handle, means for co-axially supporting the cover and handle, the cover and handle being free from each other throughout a raising and carrying position of the handle and having means to engage only when the handle is rotated a predetermined amount away from the cover in its closed position and thereupon to engage and raise the cover.

6. In a safety container, a pouring spout, a cover therefor, a movable handle, a movable support for the cover, the support and the handle being free from engagement during an angular raising movement of the handle and having means to engage when the handle is raised a predetermined distance from the cover and spring means tending to keep the handle down over the cover and the cover in closed position.

7. In a safety container, a pouring spout, a cover therefor, a support for the cover, a handle having projecting arms, the cover support and the handle arms having co-axial pivoting means, a spring tending to keep the cover in closed position, a separate spring for the handle tending to press it in closed position against the cover support whereby the handle protects the cover, and means on the cover support and the handle to inter-engage for raising the cover only when the handle has been rotated beyond a vertical carrying position relative to the container.

8. In a safety container, a pouring spout, a fluid-tight cover therefor, a pivoting support for the cover having projecting ears, a handle free from the cover and also pivotally supported having arms to engage the ears for raising the cover when the container is tilted for pouring.

9. In a safety container, a pouring spout, a cover therefor, a support for the cover having a channel portion at the top of the cover and a pivoting support at one side of the cover, a carrying handle for the container and means for pivotally supporting it at one side of the cover, the handle including a cross brace adapted to engage the channeled edge of the cover support and a spring tending to press the cross piece of the handle against the cover support, the handle in this position extending over and protecting the cover in its closed position.

10. In a safety container, a top with a pouring spout, a bracket having spaced arms and secured to the spout and the top, a cover for the spout, a support for the cover having arms extending within the arms of the bracket, a handle having side supports extending outside of the bracket arms, a common pivot pin extending through the bracket arms upon which the cover support and the handle are pivoted, the handle and cover support having separate springs extending about the pivot and bearing against them for holding the cover in closed position at the end of the spout and the handle in position overlying the spout for protecting it.

11. A structure in accordance with claim 10 in which the cover support is provided with ears extending over the edges of the bracket arms and the handle supports mounted on the outsides of the bracket arms are in a path to engage the ears for moving the cover upwardly when the handle is raised beyond an upright position with respect to the bracket arms.

JOSEPH PUTZ.